Sept. 5, 1933.   W. W. LASKER, JR   1,925,262
CARRYING MECHANISM FOR TABULATING MACHINES
Original Filed Sept. 18, 1928   5 Sheets-Sheet 1

Sept. 5, 1933.   W. W. LASKER, JR   1,925,262
CARRYING MECHANISM FOR TABULATING MACHINES
Original Filed Sept. 18, 1928   5 Sheets-Sheet 3

William W. Lasker, Jr. Inventor
By his Attorney H. A. Sparks

Sept. 5, 1933.  W. W. LASKER, JR  1,925,262
CARRYING MECHANISM FOR TABULATING MACHINES
Original Filed Sept. 18, 1928   5 Sheets-Sheet 4

Sept. 5, 1933.   W. W. LASKER, JR   1,925,262
CARRYING MECHANISM FOR TABULATING MACHINES
Original Filed Sept. 18, 1928   5 Sheets-Sheet 5

Inventor
William W. Lasker, Jr.
By his Attorney H. A. Sparks

Patented Sept. 5, 1933

1,925,262

UNITED STATES PATENT OFFICE 1,925,262

CARRYING MECHANISM FOR TABULATING MACHINES

William W. Lasker, Jr., Brooklyn, N. Y.

Original application September 18, 1928, Serial No. 306,711. Divided and this application December 4, 1929. Serial No. 411,477

7 Claims. (Cl. 235—133)

REISSUED
DEC 8 1936

This invention relates to carrying mechanism for tabulators and like devices, and is a division of my pending application Serial Number 306,711, filed September 18, 1928.

The principal object of this invention is to provide a suitable carrying or tens-transfer mechanism for a tabulator operable by data cards or documents having data indicated thereon by deposits of electrical conducting material, such, for instance, as the document shown in my United States Patent #1,567,325, issued December 29, 1925.

Another object is to produce a novel carrying device for a registering device in which one portion of the cycle of operation is devoted exclusively to registering and another portion to carrying.

Another object is to produce a device of this nature which may be operated at very high speed.

Other objects will be apparent from the following specification and appended claims. All of these objects are attained by mechanisms shown in the accompanying drawings, in which:

Like characters of reference refer to like parts in all views.

The frames

Figure 1:
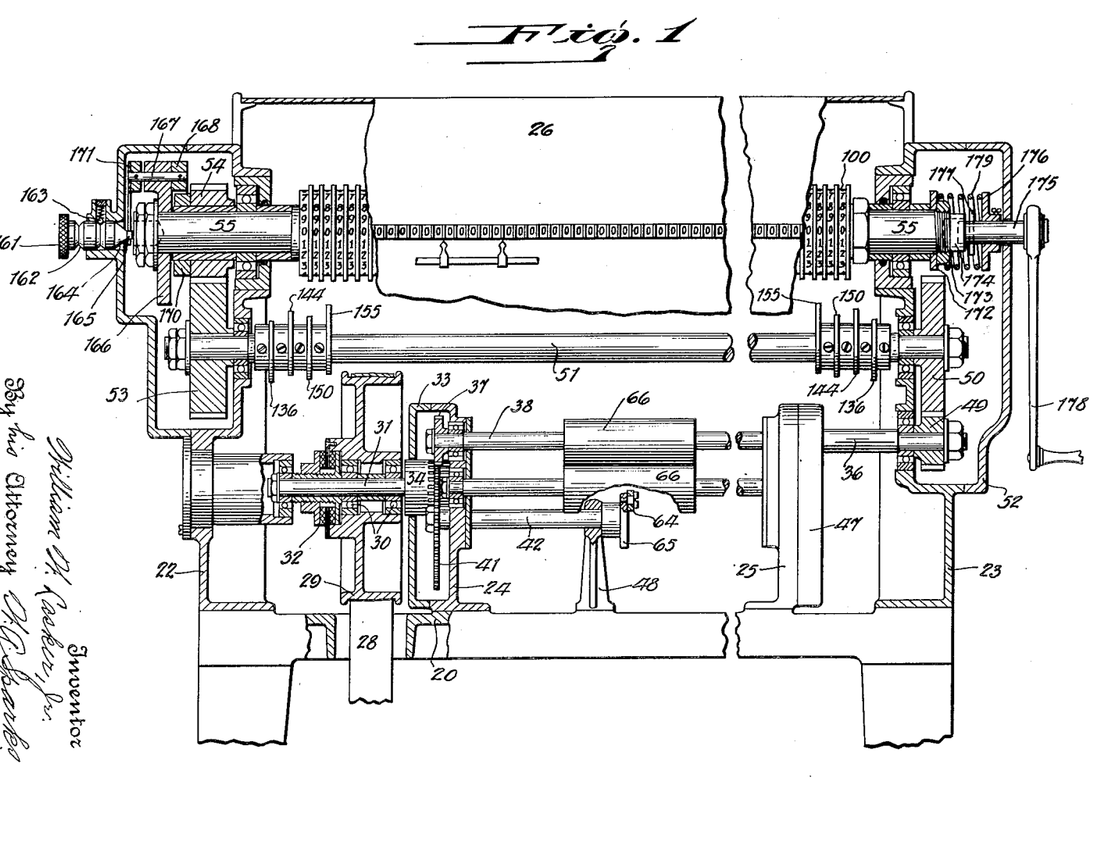
Fig. 1 is a fragmentary front elevation partly in section of a machine embodying the invention, certain parts being omitted for the sake of clearness.
Figures 2, 16:
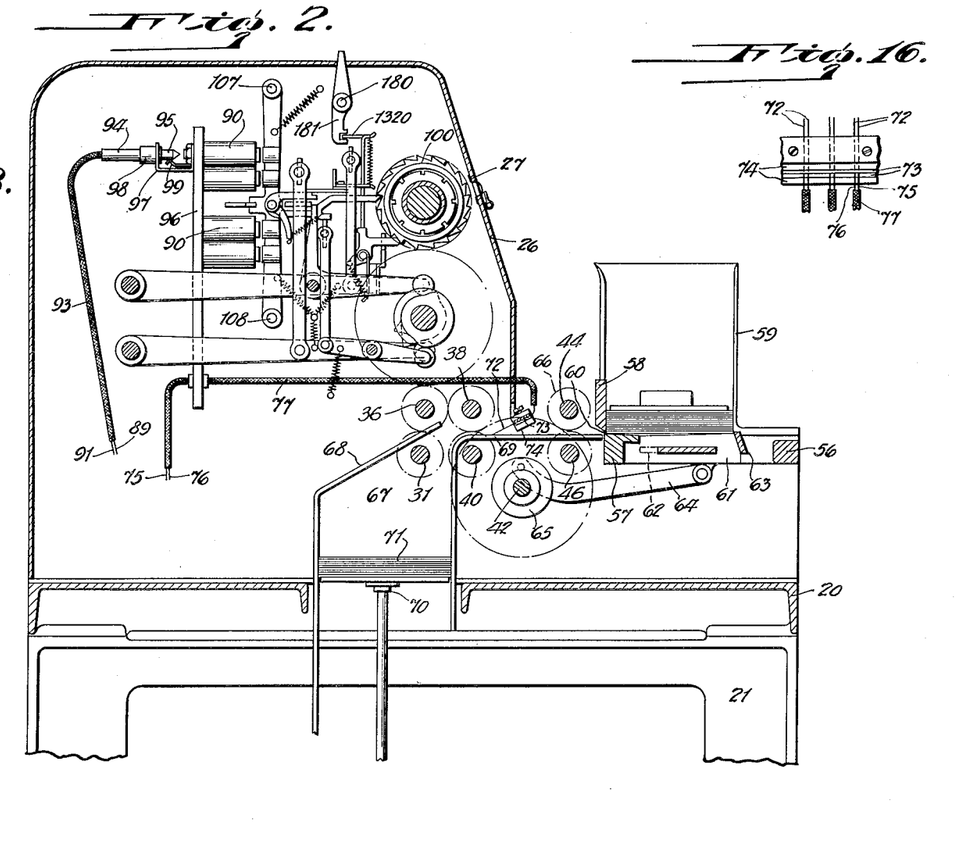
Fig. 2 is a front-to-rear vertical sectional view of the same.
Fig. 16 is a fragmentary detail top plan view of the sensing brush devices.

Referring to the drawings in detail, and in particular to Figs. 1 and 2, 20 represents the main base plate which may be supported in any suitable manner, as by a supporting frame 21. Secured to and extending upwardly from the base plate 20 are side frames 22 and 23 and intermediate frames 24 and 25. A cover 26 of suitable form encloses and protects the top part of the machine, and is provided with a suitable aperture 27 for viewing the accumulator dials.

Main driving mechanism

A belt 28 is constantly driven from a motor or other source of power (not shown); and this belt drives a pulley 29 mounted for rotation on bearings 30, Fig. 1. Bearings 303 are mounted on a short shaft 31, which shaft may be connected to the pulley 29 by means of a clutch indicated generally at 32. This clutch may be of any suitable well known type, so that the details of its construction will not be described. The clutch shown in the drawings is of the "Bendix" type.

Figure 8:
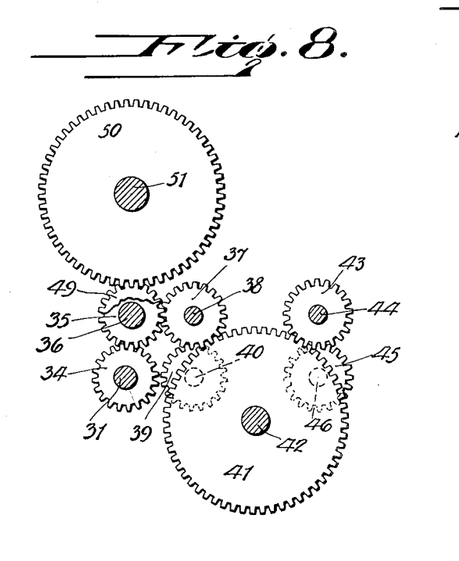
Fig. 8 is a detail view of the driving gears.

The shaft 31 passes thru an aperture in a gear housing member 33 secured to the frame member 24, and carries a gear member 34, Fig. 8. The shaft 31 has one bearing in frame 22, Fig. 1, and the gear member 34 is recessed to admit a bearing carried by a stud (not shown) on frame 24. This gear 34 meshes with a gear 35 on a shaft 36 mounted on bearings in frames 24 and 23. Gear 35 meshes with a broad gear 37 secured on a shaft 38, gear 37 in turn meshing with a gear 39 on a shaft 40 and with a large gear 41 on a short shaft 42. The large gear 41 meshes with a second broad pinion 43 fast on a shaft 44, and pinion 43 meshes with a pinion 45 fast on a shaft 46. Shafts 38, 40, 44 and 46 are all mounted in bearings in the intermediate frames 24 and 25, and carry intermeshing gear pinions 37, 39, 43 and 45, these pinions and bearings being protected by housings formed by the intermediate frames 24 and 25 and associated housing members 33 and 47. The short shaft 42 is mounted in bearings in the frame 24 and in a bracket 48, Fig. 1. These five shafts 38, 40, 42, 44 and 46 control the card feed, which will presently be described in full.

Shaft 36, above mentioned, carries at its extreme right-hand end a gear pinion 49, Figs. 1 and 8, which meshes with a gear 50 secured on a cam shaft 51 mounted in bearings in the frames 22 and 23. Gears 49 and 50 are enclosed in a housing formed by frame 23 and a housing member 52. The specific cams on this shaft and the mechanism operated thereby will be hereinafter fully described.

Mounted on the left hand end of cam shaft 51 and secured thereto so as to be rotated therewith is a mutilated gear 53, Figs. 1 and 9, which engages a mutilated gear 54 rotatably mounted on the accumulator shaft 55, and normally clutched to said shaft 55 by means hereinafter described, so that rotation of gear 53 normally effects intermittent rotation of accumulator drive shaft 55.

The main driving mechanism has now been described, and it will be seen that the shafts for driving the card-feed devices, the cam mechanisms, and the accumulator wheels are all interconnected and therefore work in perfect timed relation or synchronism. We shall now take up the details of the card-feed devices.

Card-feed

As shown in Fig. 2, three bars 56 and 57 and 58 extend between and are supported by the intermediate frames 24 and 25. Supported by these bars 56, 57, and 58 and extending upwardly therefrom is a card magazine 59. Bars 57 and 58 are spaced apart so as to form a card throat 60 thru which only one card may pass at a time. The cards placed in the magazine 59 rest upon the upper surface of bar 57 and on the sides of the picker frame.

A picker frame 61 is mounted for sliding movement in ways 62 formed in the frames 24 and 25 or in pieces secured thereto and is provided with a picker blade 63 which may be adjustable if desired for different thicknesses of cards; and which is adapted to pick off the bottom card in the magazine 59 and force it thru the throat 60 when it (the picker knife) is reciprocated by the picker frame. The above mechanism is similar to that now in use with punch-card equipment and any type of such well-known mechanism could be used.

The picker frame 61 is connected to a link 64 which has its rear end eccentrically connected to a disk 65 mounted on and rotatable with the shaft 42, Fig. 1. It will now be apparent that at each cycle of gear 41 and shaft 42, the picker frame 61 will receive one complete reciprocation thereby ejecting one card thru throat 60.

Mounted on shafts 38, 40, 44 and 46 are feed rolls 66 of any desirable and adequate material; and as a card is ejected from throat 60, it is introduced between the feed rolls on shafts 44 and 46 and by them passed on to the feed rolls on shafts 38 and 40. This last pair of rolls passes the card into a card receptacle 67, Fig. 2. One of the walls of this receptacle is extended upwardly into a card-deflecting plate 68; while another wall is of insulating material and is extended to the throat 60 forming a card guiding table 69 formed with apertures to accommodate the feed-rolls 66. The bottom of the receptacle 67 may be in the form of a spring pressed plunger 70, as in common practice in punch-card equipment, and which moves down under the accumulated weight of the cards 71. As the cards are moved along the table 69 they are sensed as to their data and the mechanism for this purpose will now be described.

Sensing means

The sensing mechanism includes a plurality of pairs of contact brushes 72, there being one pair of brushes 72 for each column or denomination or order of data on the card or document to be sensed. The brushes of each pair are arranged close enough to each other to be bridged by a data indicating spot or mark on the document to be analyzed, and the pairs of brushes are spaced apart according to the columnar spacing of the card or document. The several brushes 72 are held in alignment between two strips 73 of insulating material which are pressed together by metal plates 74 screwed together and supported by frames 24 and 25 or other suitable means. The brushes 72 are thus held stationary and in such relation to the card support 69 as to wipe along the several columns of the card as the card is moved by the feed rolls, so that the brushes of any pair will be connected by a data spot in that column.

Figure 10:
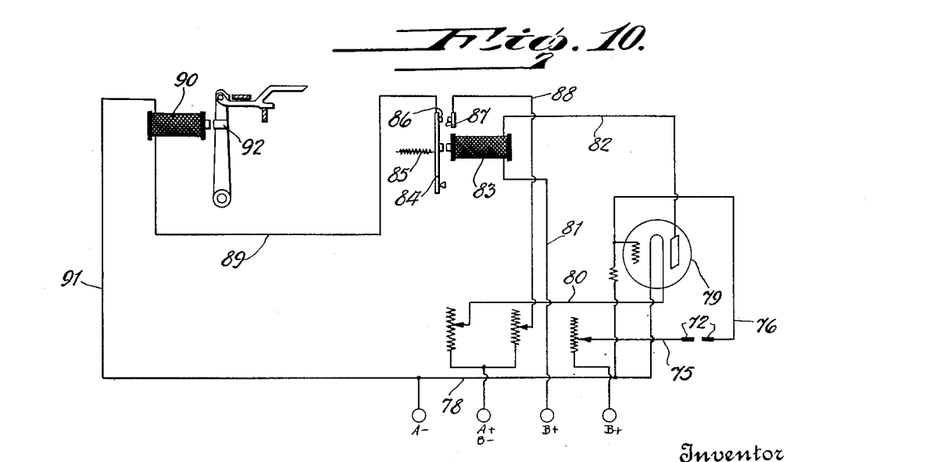
Fig. 10 is a typical wiring diagram.

The brushes of each pair are connected to respective leads 75 and 76, Figs. 10 and 16; and each pair of leads 75 and 76 forms a cable 77 which is conducted to the rear of the machine as shown in Fig. 2. In Fig. 10, there is shown the circuits controlled by one pair of brushes 72. From this figure it will be seen that the lead 75 passes to the positive side of a "B" battery, while the lead 76 passes to a lead 78 connected to the negative side of an "A" battery. This lead 76 is also connected to the grid or a thermionic valve 79. The usual filament circuit is shown as including an inlet lead 80 and an outlet connection to lead 78. The plate circuit is shown as including leads 81 and 82 connecting, respectively, a "B" plus terminal with a relay 83, and relay 83 with the plate. When the grid circuit is closed by a data spot on the card closing the gap between the two brushes 72, the plate circuit is caused to energize relay 83 sufficiently to overcome the spring on its armature as is well understood by those familiar with the properties of thermionic valves. Thus it will be understood that relay 83 is always partly energized due to current passing from the plate to the filament, but normally this is not sufficient to cause relay 83 to overcome spring 85; however, the grid acts as a valve and allows in this case, more current to pass thru relay 83 when a data mark is contacted with, so that the relay is sufficiently energized to overcome the tension of spring 85.

When relay 83 is thus energized it attracts its armature 84 against the tension of spring 85, thereby bringing a contactor 86 on the armature into engagement with a contact 87, Fig. 10. This closes a circuit from the "A" plus thru a lead 88, contact 87, contactor 86, and lead 89 to a columnar electro-magnet 90 and from magnet 90 thru a lead 91 to the negative lead 78. The energizing of magnet 90 causes it to attract its armature 92 which results in determining the amount of actuation of the respective columnar accumulator wheel as will be later specifically described.

The leads 89 and 91 associated with any pair of brushes form a single cable 93, Fig. 2, which cable has at its end an outer contact member 94 connected to one of the leads 89 or 91, and a contact point 95 connected to the other of these leads. Elements 94 and 95 are of course, properly insulated from each other. A supporting member 96 suitably supported by a stationary part of the machine, carries all of the magnets 90, the magnets being arranged in different tiers and in staggered relation so as to obtain the desired compact arrangement. One terminal of each magnet is connected to a contact member 97 provided with a socket 98 which receives and closes contact with contact element 94. The other terminal of each magnet is connected to a spring contact 99 adapted to engage the corresponding contact pin 95.

It will now be apparent that the terminals of the several cables 93 are supported by frictional engagement of elements 94 and 98 and that any cable may be connected to any magnet so that data appearing in any column may be made to control any desired one of the magnets 90, so as to transpose data as they are entered on the register. Having now described the sensing mechanism, the accumulating or registering mechanism will next be taken up.

*Registering mechanism*

The register comprises any desired number of accumulator wheels 100, Figs. 1, 2, 15 and 17 each of which has a ratchet wheel 101 secured to it. The accumulator wheels with their ratchet wheels are free to rotate on shaft 55 but are held against longitudinal displacement thereon in any desirable manner. Secured to the shaft 55 so as to rotate therewith are a plurality of friction disks 102, one for each wheel 100, which are serrated at their outer edges and cupped so as to form friction fingers. All of the friction fingers of a disk bear against the inner face of its respective wheel 100 so that when shaft 55 is turned it carries with it disks 102 and thereby tends to turn all of the wheels 100.

It may be stated that the number of accumulator wheels 100 may be the same as the number of item columns on the documents or may exceed this number where it is desired to have extra wheels in which to accumulate surplus carried up from any of the wheels. Each wheel is provided with two series of digits " 0 " to " 9 ", inclusive.

Normally, the wheels 100 are prevented from turning with shaft 55 by stop fingers 103 which engage the respective ratchet wheels 101. These stop fingers 103 are formed on slide bars 104 pivoted at 105 to respective rock arms 106. These rock arms 106 carry respective armatures 92 and are pivoted on two bars 107 and 108, Fig. 2, from which they extend either downwardly or upwardly, as the case may be, so as to accommodate themselves to the positions of the magnets 90. The ends of arms 106 are guided by fingers 109 which extend into slots 110 formed in the front edge of a stationary cross bar 111.

It will now be understood that when a magnet 90 is energized, it effects rocking of its respective arm 106 against the force of its spring 300 thereby drawing the respective slide 104 rearwardly so as to move its finger 103 out of engagement with the respective ratchet wheel 101 so that the associated accumulator wheel 100 may turn with the shaft 55.

Also pivoted on each pivot pin 105 is a pawl having an upper arm 112 provided with a stop shoulder 113, and a lower arm 114 to which is attached one end of a spring 115. The other end of spring 115 is attached to slide 104, so that the spring 115 holds the respective slide down against a bar 116 and holds the upper arm 112 normally against the under face of a plate 117 supported by a stationary bar 131. When an arm 106 is rocked, the respective pawl 112—114 is drawn rearwardly until the shoulder 113 escapes plate 117 at which time spring 115 rotates the pawl so as to bring stop shoulder 113 up in rear of plate 117 thereby locking the members 106, 104, and 112—114 in retracted position. The arms 112 are later moved down by a universal release bar 118 as later described. Springs 300 hold the arms 106 and connected parts forwardly.

Figure 9:
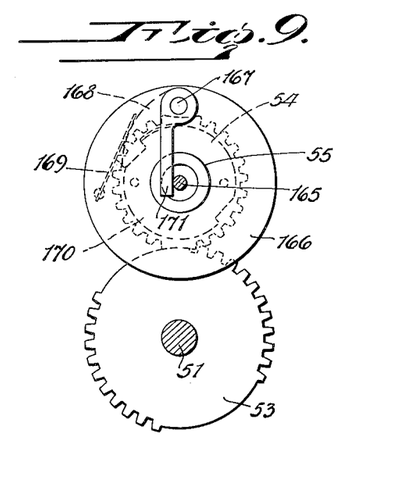
Fig. 9 is a detail view of the accumulator shaft drive and resetting means.

Turning now to Fig. 9, it will be seen that gears 53 and 54 are both mutilated so that during a complete rotation of gear 53, which is co-incident with one complete cycle of operation of the machine, there will occur two half revolutions of gear 54 separated by considerable dwells or periods of idleness. Considering gear 54 as locked to shaft 55, this will impart two half revolutions to shaft 55. One of these half revolutions is utilized to effect adding, and the other to effect carrying.

The cards or records are fed to the brushes 72 with their highest digit position first and lowest digit position last. Consequently if a data spot is in a higher digit position it will traverse its brushes and operate its magnet 90 some time earlier in the cycle than the magnet would have been operated if the data spot had been in a lower digit position. Thus if the spot is in " 9 " position its magnet will be operated to release the respective accumulator wheel so that it will travel nine digit spaces before the dwell in the movement of shaft 55 occurs; and if a spot is in the " 1 " position, the accumulator wheel will be released so much later that it will move only one digit space. During the ensuing dwell after an adding operation, bar 118 moves down and releases all of the elements 112, whereupon any members 104 which had been moved back to permit adding, are again moved forwardly into engagement with their ratchets 101. If any accumulator wheel has been turned past its " 9 " indication during adding, one must be carried up to the next higher accumulator wheel during the last half-cycle of operation, and the means for this purpose will now be described.

*Carrying*

Figure 15:
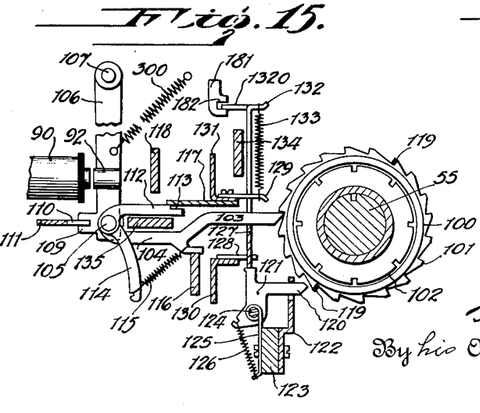
Fig. 15 is a detail view of the accumulator controlling devices.
Figure 17:
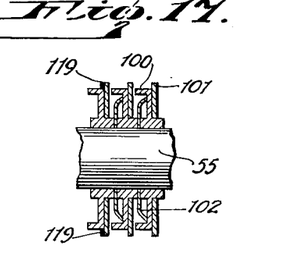
Fig. 17 is a detail sectional view of several accumulator wheels.

Each of the ratchet wheels 101 carries two laterally extending teeth or tappets 119, Fig. 15. When an accumulator wheel 100 is passing from " 9 " to " 0 ", one or the other of these tappets 119 engages the finger 120 of a respective pawl 121. The fingers 120 of all of the pawls are guided in slots formed in the upper portion of a guide plate 122 secured to a stationary bar 123. All of the pawls 121 are pivoted on a rod 124 supported by a plate 125 also secured to stationary bar 123. The plate 125 has its upper portion slotted and curved about rod 124 so that it not only supports rod 124 but also spaces the pawls 121. Springs 126 tend constantly to hold pawls 121 in normal position.

Each pawl 121 normally supports a slide 127 which is slotted to permit the passage of the finger 103 of next higher denominational order, the bottom of the slot being normally substantially in contact with the respective finger 103. The slides 127 are guided for vertical movement by slots formed in plates 128 and 129 supported, respectively by stationary members 130 and 131. The slot cut to permit passage of finger 103 divides each slide 127 into two upwardly extending elements the upper end of one of which is bent forwardly into a finger 132, and the upper end of the other of which is bent rearwardly into a finger 1320. The finger 132 of each slide carries one end of a spring 133, the other end of which is anchored to one of a plurality of fingers formed on the front edge of plate 129, which spring tends constantly to force the respective slide 127 downwardly. The fingers 1320 of the several slides lie over a universal restoring bar 134 which will be later described.

Whenever one of the tappets 119 engages the co-acting pawl finger 120, it rocks the pawl clockwise, as seen in Fig. 15, thereby removing the pawl from supporting position, whereupon the respective spring 133 moves its slide 127 down in rear of pawl 121 until finger 1320 reaches bar 134, thereby removing the bottom of the slot of 127 from engagement with the respective finger 103, which, it will be remembered, is of the next higher order to that of the accumulator wheel which caused the tripping action. At the end of the dwell between the adding and carrying operations, bar 116 is moved down by means which will be later described, and any fingers 103 which have had their slides 127 moved down will move down with bar 116 due to springs 115 which hold the slides 104 down against bar 116. This movement is accompanied by the rotation of the accumulator wheels corresponding to the fingers 103 so moved which rotation is now caused by the second half revolution of shaft 55. The amount of such movement is limited to a single digit space by bar 116. If successive accumulator wheels stand at "9" and one is carried by the lowest of these, carrying will take place successively during this half rotation of shaft 55.

After shaft 55 has turned its second part revolution, there is a second dwell, and during this dwell a bar 135 moves rearwardly carrying with it all of the arms 106 with their members 104 until all fingers 103 are disengaged. Bar 118 being still down the shoulders 113 are not effective. Bars 116 and 134 now move up, lifting all slides 104 and 127. Pawls 121 snap back to normal. Then bar 134 moves down to normal and bar 135 moves forward to normal so that all fingers 103 again return to engagement with their ratchets; and then bar 118 moves up ready for the new cycle of operation.

The means for operating bars 116, 118, 134 and 135 will now be described.

Cam shaft operation

Referring now particularly to Figs. 1, 2, 4, 5, 6, 7, 11, 12, 13, and 14, it will be seen that cam shaft 51 carries eight cams, four at each side of the machine. Each cam at one side of the machine is the duplicate of one of the cams at the other side, so that we have a pair of cams for operating each of the four bars 116, 118, 134 and 135.

Figure 12:
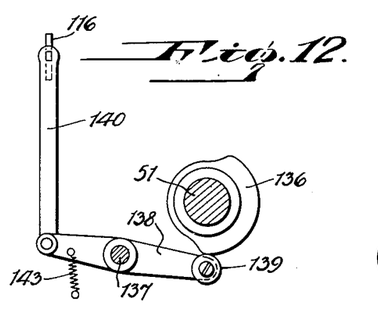
Figure 18:
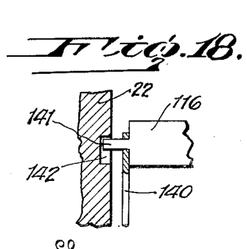
Fig. 18 is a detail of one of the cam operated bars.

Two cams indicated at 136 are located at the extreme right and left of the groups of cams, and these two cams are utilized to operate bar 116 thru means shown in Figs. 2 and 12. Pivotally mounted on studs or stub shafts 137 secured to the opposite side frames of the machine, are rock levers 138, each of which is provided at its front end with a roller 139 riding on the periphery of its respective cam 136. The rear ends of levers 138 are pivotally connected to upright links 140 rigidly connected to opposite ends of the bar 116, the ends of bar 116 being extended as at 141 and guided in ways 142 in the side frames as indicated in Fig. 18. Suitable springs 143, Fig. 12 may be attached to levers 138 to keep the rollers 139 in constant contact with the cams 136.

Figure 11:
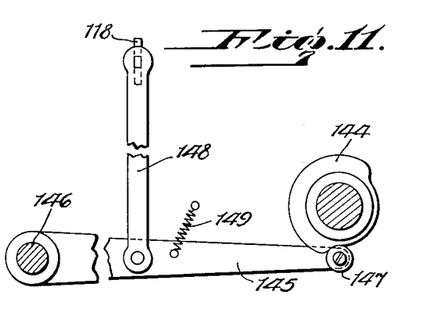
Figs. 11, 12, 13, and 14 are views of respective cams and the mechanism directly operable thereby.

The two cams adjacent to cams 136 are indicated by reference character 144; and these two cams are identical and operate means shown in Figs. 2 and 11, to effect proper movement of bar 118. This means includes two rock arms 145 pivotally mounted on a thru-shaft 146 supported by the main side frames of the machine. Each rock-arm 145 carries at its front end a roller 147 riding on the respective cam 144, and has an upright link 148 pivotally connected to it between its ends. These links 148 are connected at their upper ends to the cross bar 118 by means similar to that for 116 shown in Fig. 18; and they move bar 118 in conformity with the peripheries of cams 144. Suitable springs 149 hold the rollers 147 in contact with the cams 144.

Figure 13:
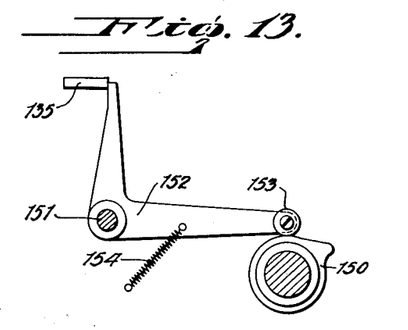

The two cams adjacent to cams 144 are indicated at 150, Figs. 2 and 13, and control operation of bar 135. Pivotally mounted on studs or stub shafts 151 extending inwardly from opposite side frames, are rock-levers 152. The forwardly extending arms of these levers 152 carry rollers 153 engaging the peripheries of cams 150; and the upwardly extending arms are rigidly secured to the front side of bar 135 so as to move the same in conformity with cams 150. Springs 154 keep rollers 153 in engagement with cams 150.

Figure 14:
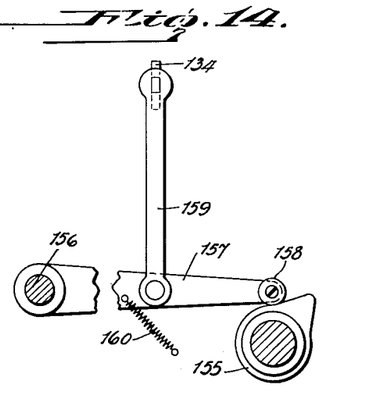

Mounted on shaft 51 adjacent to cams 150 are cams 155 which control movement of bar 134 by means shown in Figs. 2 and 14. Pivoted on a thru shaft 156 are two arms 157 which carry rollers 158 engaging cams 155. Upright links 159 connect the arms 157 to bar 134 in the same manner as shown for bar 116 in Fig. 18, so as to cause the bar 134 to move in accordance with the operation of cams 155. Springs 160 hold rollers 158 in engagement with cams 155.

Clearing

When it is desired to clear the machine or turn the accumulator wheels to zero, means shown in Figs. 1 and 9 is utilized. This means includes a manipulative pin 161 which has grooves 162 which co-operate with a spring pressed ball 163 to hold the pin in either of two positions. At its inner end pin 161 has a conical cam portion 164 terminating in a reduced cylindrical portion 165.

Secured to shaft 55 so as to turn therewith is a disk 166 which carries a rotatable pin 167. Pinned to the inner end of pin 167 is a pawl or dog 168 which is normally pressed by a spring 169 into engagement with a notch or recess formed in the periphery of a hub-like member 170 pinned on pinion 54 thereby locking disk 166 to gear 54. The pin 167 also carries at its outer end and pinned to it, a finger 171, which rests against the portion 165 of pin 161.

It will now be seen that if pin 161 is pressed inwardly, it will cause the conical cam portion 164 to rock finger 171 thereby rocking pin 167 and moving dog 168 out of engagement with 170. This frees shaft 55 from the driving influence of pinion 54.

The right-hand end of shaft 55 is provided with a disk 172 and a clutch tube 173 both of which are secured to shaft 55 so as to turn with the latter. The clutch tube 173 has ways 174 formed therein at its free end, which ways are diametrically opposite each other and cut angularly. Slidably mounted in the housing member 52 is a short shaft 175 which carries a disk 176 secured thereto for rotation therewith. A pin 177 extends thru the shaft 175 and projects on opposite sides thereof. The inner end of shaft 175 extends into the clutch tube 173 by which it is guided in its sliding or longitudinal movements. A handle or crank 178 is secured to shaft 175 so that the latter may be moved longitudinally and rotated by an operator. When shaft 175 is pressed in and turned counter-clockwise (as viewed from the right), the ends of pin 177 enter the ways or slots 174, and shaft 55 is thereby secured to shaft 175 so that by turning handle 178 counter-clockwise, shaft 55 will be turned in the same direction which is the opposite direction to that in which it is turned for adding. A spring 179 is interposed between disks 172 and 176 and tends constantly to disengage shafts 55 and 175 and to hold the latter in its outward position.

When it is desired to clear the machine,—i. e., turn all of the wheels 100 to zero,—the shaft 55 is first disconnected from the regular driving mechanism as above described. Then handle 178 is pressed inwardly and turned so as to cause shaft 175 to effect entry of the ends of pin 177 into the ways 174. Upon further turning of handle 178, shaft 55 is rotated in a direction opposite to that for adding and carries with it all of the accumulator wheels 100 and their coacting ratchet wheels 101 until a tooth 119 of each ratchet wheel abuts against a respective finger 120. When any tooth 119 engages a finger 120, the respective ratchet wheel and accumulator wheel are stopped, and at such time the accumulator wheel is at zero. When the shaft 55 has been sufficiently turned to bring all accumulator wheels to zero, the handle 178 is released and spring 179 effects disengagement of shaft 175 from shaft 55. It is of course understood that fingers 103 merely ratchet over the teeth of the ratchet wheels during this clearing operation.

*Splitting*

Means are provided for splitting the accumulator wheels into sections for separately accumulating various series of items. For this purpose means are provided for disabling the carrying mechanism at any desired point or points.

As shown in the drawings, a pivot rod 180 (Fig. 2) is supported in the main frames of the machine, and carries a plurality of rock members 181, one for each carry latch 127. The upper ends of members 181 project thru the casing 26 so as to be readily movable back and forth by the operator and are held in either of two positions by friction or other suitable means. The lower portion of each member 181 stands in rear of a respective finger 1320 and is formed with a notch 182 for engagement with said finger. When any member 181 is rocked to one extreme position its notch 182 engages the respective finger 1320 thereby preventing carrying action of the respective member 127; but when the member 181 is moved to its other position, notch 182 is entirely in rear of finger 1320 and the carrying is effective.

*Timing*

Considering now the sequence of operations and timed relation of parts, we shall arbitrarily fix as the normal position or start of a cycle, that position of the parts at the instant that the mutilated gears 53 and 54 stand as shown in Fig. 9 just ready to begin the adding portion of the cycle. The cycle is graphically indicated in Fig. 3 by a circle, on which the essential points of operation are indicated by letters. Thus the point A indicates the normal position as above defined. At this point the adding portion of the cycle is about to begin and bars 116, 118, 134 and 135 and connected parts stand as shown in Figs. 11 to 15.

Figure 3:
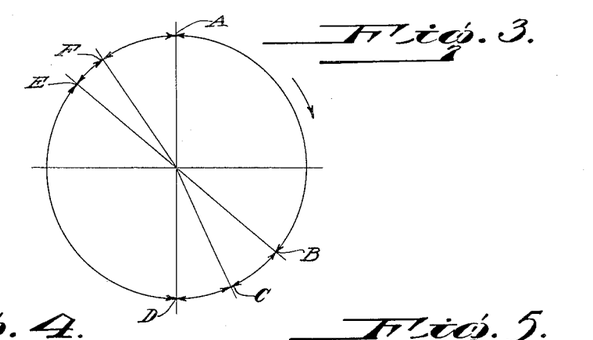
Fig. 3 is a timing diagram for the machine cycle.
Figure 4:
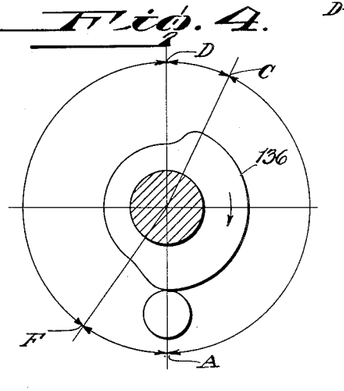
Figs. 4, 5, 6, and 7 are timing diagrams or charts for respective cams.
Figure 5:
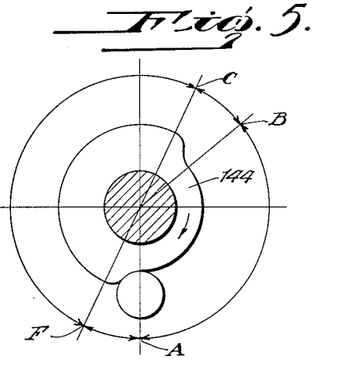

The adding portion of the cycle is indicated by the arc running from A to B. At point B the adding operation is complete; the lower dwell shown in Fig. 9 is beginning; cam 144 is beginning to lower 118; and the card has passed completely thru the sensing zone.

The arc between B and C represents the portion of the cycle consumed by cam 144 in bringing bar 118 to its lowest position. At point C the bar 118 is in its lowest position and remains there until point F is reached; also cam 136 begins to lower bar 116 at point C.

The arc between points C and D represents the portion of the cycle consumed by cam 136 in completely lowering bar 116. At point D the bar 116 is down; and the carrying portion of the cycle is about to begin, the lower dwell of Fig. 9 having been finished.

The carrying portion of the cycle is represented by the arc between points D and E. At point E the upper dwell of Fig. 9 has been reached and cam 150 begins to take effect for moving bar 135 rearwardly.

Figure 6:
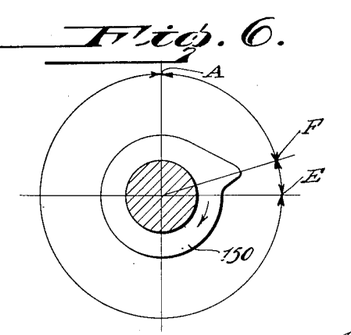
Figure 7:
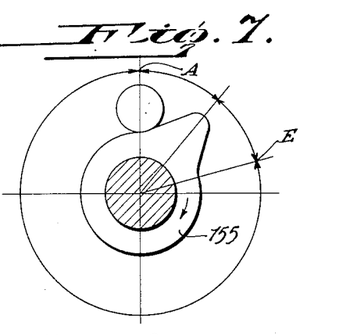

Bar 135 is moved rearwardly by cam 150 during that portion of the cycle represented by the arc from E to F Fig. 6 and at point F the cam 150 is fully effective and cam 155 begins to be effective. During the portion of the cycle represented by the arc between points F and A, cam 155 becomes fully effective thereby raising bar 134 and with it all of the carrying latches 127 which have been moved from their normal position. At substantially the same instant, cam 136 causes the raising of bar 116, cam 150 releases bar 135 to move back to normal so that all of the members 103 again engage their respective ratchet wheels, and after the members 103 have started their return movement cam 144 again permits the raising of bar 118 to its normal position, which raising it will be remembered is effected by springs 149.

In Figs. 4, 5, 6, and 7 the cams are shown in their normal relation to their respective rollers and the cycle of their operation is marked with the same indicia as used in Fig. 3 altho it must be borne in mind that in these charts the letters refer to the portions of the cams effective on the rollers at the different points indicated by the same letters in the graphic representation of the machine cycle shown in Fig. 3. It might be that best results in the actual machine would be obtained by setting the cams a few degrees one way or the other; but, of course, the same sequence of operation of the elements would be retained as above described.

While I have described what I consider to be the most desirable embodiment of my invention, it will be obvious that many changes and substitutions of equivalent elements could be made without in any way departing from the spirit of my invention. I, therefore, do not limit myself to the exact embodiment herein shown and described nor to anything less than the whole of my invention as hereinbefore set forth and as hereinafter claimed.

I claim:

1. In a device of the class described, the combination of two accumulator wheels of successive denominational orders, a respective detent for each of said accumulator wheels, individual means for retaining each detent in normal position, common means for retaining said detents in normal position, means controllable by the accumulator wheel of lower order for rendering the individual retaining means of the accumulator wheel of higher order ineffective and means for automatically moving said common means to ineffective position.

2. In a device of the class described, the combination of two accumulator wheels of successive denominational orders, a respective detent for each of said accumulator wheels, individual means for retaining each detent in normal position, common means for retaining said detents in normal position, means controllable by the accumulator wheels of lower order for rendering the individual retaining means of the accumuator wheels of higher order ineffective and means for automatically moving said common means to ineffective position and for automatically returning said means to effective position.

3. In a device of the class described, the combination of two accumulator wheels of successive denominational orders, a respective detent for each of said accumulator wheels, individual means for retaining each detent in normal position, common means for retaining said detents in normal position, means controllable by the accumulator wheels of lower order for rendering the individual retaining means of the accumulator wheels of higher order ineffective, means for automatically moving said common means to ineffective position, and a manipulative device for retaining each detent in normal position regardless of the condition of said individual means and of said common means.

4. In a machine of the class described, the combination of a plurality of accumulator members, a shaft common thereto for effecting operation of said members, driving means for effecting two increments of movement of said shaft at a single cycle, one increment for effecting accumulating and the other for carrying, an individual stop for each of said accumulator members, individual means for retaining said detents in normal position and operable by the accumulator members of lower orders, and a common means for retaining said detents in normal position and operable by said driving means during the second said increment of movement of each cycle.

5. In a machine of the class described, the combination of a plurality of accumulator members, a shaft common thereto for effecting operation of said members, driving means for effecting two increments of movement of said shaft at a single cycle, one increment for effecting accumulating and the other for carrying, an individual stop for each of said accumulator members, individual slides for retaining said stops in normal position and each formed with an angularly disposed portion, common means for retaining said stops in normal position and operable by said driving means during the second said increment of movement of each cycle, and a lever formed with a portion cooperative with said angularly disposed portion of one of said slides, for retaining the same in normal position.

6. In a device of the character described, the combination of two accumulator wheels of successive denominational orders, a respective detent for each of said accumulator wheels, individual means for retaining each detent in normal position, common means for retaining said detents in normal position, means controllable by the accumulator wheel of the lower order for rendering the individual retaining means of the higher order ineffective, means whereby the detent of the higher order is controllable by the common retaining means while the individual retaining means of the higher order is ineffective, common means for moving said detents to ineffective position, individual means for retaining said detents in ineffective position, common means for restoring each detent to normal position, and common means whereby the individual means for retaining the detent of the higher order in normal position is restored to effective position.

7. In a device of the character described, the combination of two accumulator wheels of successive denominational orders, a respective detent for each of said accumulator wheels, individual means for retaining each detent in normal position, common means for retaining said detents in normal position, means controllable by the accumulator wheel of the lower order for rendering the individual retaining means of the higher order ineffective, means controllable by the common retaining means for moving the detent of the higher order so as to allow its accumulator wheel to advance one digit space while the individual retaining means is ineffective, common means for moving the respective detents to ineffective position, individual means for retaining said detents in ineffective position and common means for automatically restoring said detents to normal position and common means for automatically restoring the said individual retaining means to effective position.

WILLIAM W. LASKER, Jr.